United States Patent [19]

Yamamoto

[11] Patent Number: 4,874,199
[45] Date of Patent: Oct. 17, 1989

[54] POWER-DRIVEN COWL FOR AN AUTOMOTIVE VEHICLE

[75] Inventor: Takeshi Yamamoto, Hiroshima, Japan

[73] Assignee: Mazda Motor Corporation, Hiroshima, Japan

[21] Appl. No.: 109,890

[22] Filed: Oct. 19, 1987

[30] Foreign Application Priority Data

Oct. 17, 1986 [JP] Japan ................................ 61-245185
Oct. 17, 1986 [JP] Japan ................................ 61-245186

[51] Int. Cl.4 .......................... B62D 25/08; B60S 1/04
[52] U.S. Cl. .................................... 296/192; 296/202; 15/250.16
[58] Field of Search ..................... 296/192, 194, 202; 15/250.16, 250.17, 250.19

[56] References Cited

U.S. PATENT DOCUMENTS

| | | | |
|---|---|---|---|
| 2,895,157 | 7/1959 | Kocourek ....................... | 296/192 X |
| 3,226,756 | 1/1966 | Heiler ............................... | 15/250.19 |
| 3,601,839 | 8/1971 | Kato ................................. | 15/250.19 |
| 3,619,847 | 11/1971 | Papadatos et al. ............... | 15/250.16 |
| 4,756,568 | 7/1988 | Yamamoto et al. ........... | 15/250.16 X |
| 4,780,926 | 11/1988 | Kondo et al. .................... | 296/192 X |

FOREIGN PATENT DOCUMENTS

| | | | |
|---|---|---|---|
| 2852187 | 6/1980 | Fed. Rep. of Germany ... | 15/250.17 |
| 3437556 | 5/1985 | Fed. Rep. of Germany ...... | 296/192 |
| 1544790 | 9/1968 | France .............................. | 15/250.17 |
| 60-131450 | 9/1985 | Japan . | |

*Primary Examiner*—Dennis H. Pedder
*Attorney, Agent, or Firm*—Fleit, Jacobson, Cohn, Price, Holman & Stern

[57] ABSTRACT

A power-driven cowl for an automotive vehicle including a cowl panel which is shiftable between a closed and an open position. The cowl panel covers a front windshield wiper and in the open position uncovers the windshield wiper to allow normal operation. An electric motor causes the cowl panel to shift between the closed and open positions. A cowl forcing member forces the cowl member to uncover the windshield wiper in, for example, an emergency need. A releasable locking member holds the cowl forcing member locked to permit normal automatic operation of the power driven cowl. If the cowl driving electric motor becomes inoperative and the cowl panel is closed, the locking member can be operated by the driver to cause the cowl forcing member to open the cowl panel to uncover the windshield wiper and enable operation thereof.

9 Claims, 6 Drawing Sheets

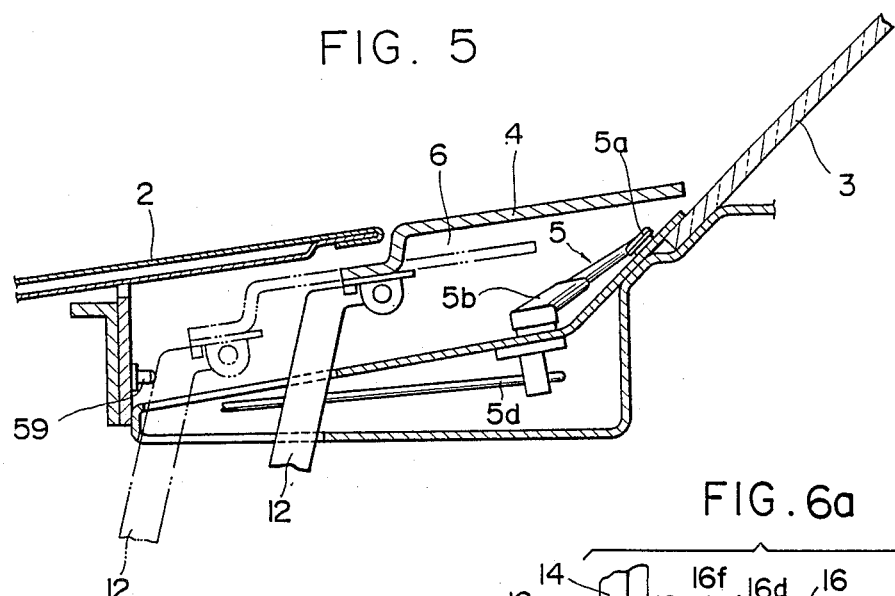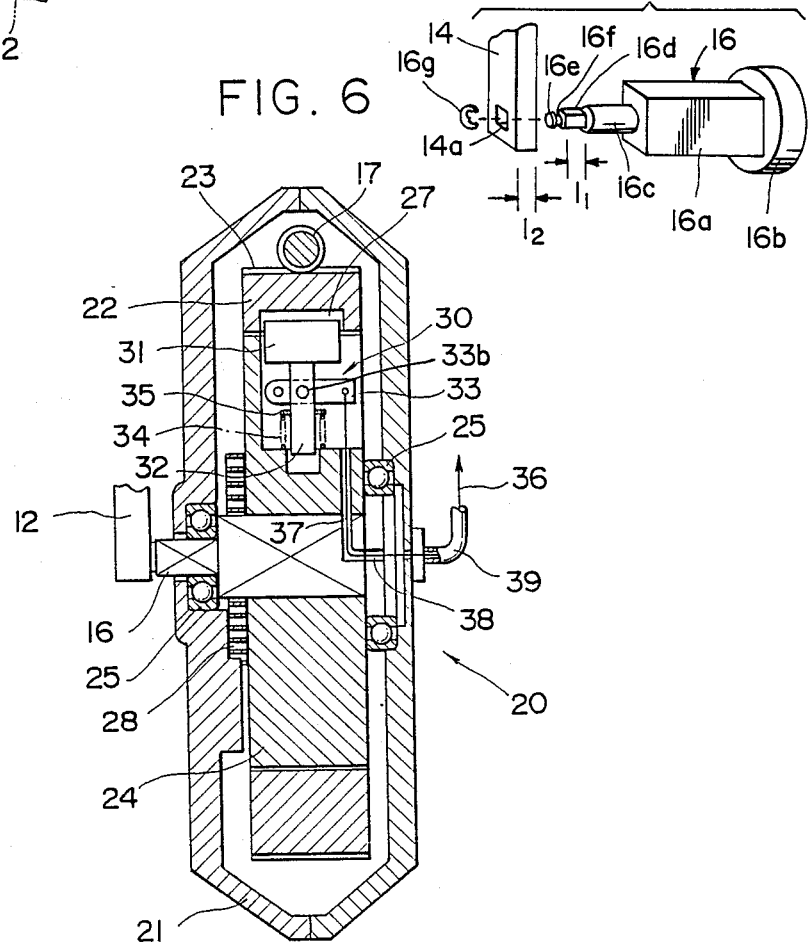

POWER-DRIVEN COWL FOR AN AUTOMOTIVE VEHICLE

BACKGROUND OF THE INVENTION

The present invention relates to a power-driven cowl for an automotive vehicle, and more particularly to a power-driven cowl which is automatically operated to cover and uncover a front windshield wiper.

As known, a front windshield wiper is disposed in a space between a rear end of an engine hood panel and a front windshield glass. For the purpose of a fair external appearance of automotive vehicle and/or the protection of the front windshield wiper, a cowl panel provided between the engine hood panel and the windshield glass is adapted to move between a closed position wherein the cowl panel covers the front windshield wiper and an open position wherein the cowl panel uncovers the front windshield wiper. The movable cowl panel is generally coupled to and operated by driving means such as a reversible electric motor to cover and uncover the front windshield wiper. One such movable cowl is disclosed in Japanese Utility Model Unexamined Publication No. 60-131,450 entitled "Concealed Type Wiper Housing Apparatus" laid open to the public Sept. 3, 1985. The movable cowl taught by the above-mentioned publication is adapted to open and close a cowl box or housing formed between a rear end of an engine hood panel and a front windshield glass wherein the front windshield wiper is housed. When the front windshield wiper is used, the movable cowl, in particular a cowl panel, is remotely operated by a driver from the driver's seat of the automotive vehicle to open the cowl box, allowing the windshield wiper to operate. In order to make it possible to remotely operate the movable cowl panel to open and close the cowl box so as to cover and uncover the front windshield wiper, the movable cowl panel is often preferred to be cooperated with power driving means such as an electric motor. Due to the provision of the power driving means, the driver is allowed remotely to open and close the movable cowl panel from the driver's seat.

However, because the movable cowl panel in its closed position prevents the front windshield wiper from normally operating, the provision of the power driven-cowl is considered to be counterproductive once the power driving means of the movable cowl panel gets out of order or becomes inoperative while the cowl panel covers up the front windshield wiper. If in fact the power driving means accidentally gets out of order or inoperative with the movable cowl panel left in the closed position during driving, in particular, in rain or snow, the front windshield wiper cannot operate, and the driver's sight is greatly impaired. In a heavy rain or snow, a traffic accident may be caused from poor visibility induced owing to an inoperative front windshield wiper.

OBJECT OF THE INVENTION

It is, therefore, an object of the present invention to provide a power-driven cowl for an automotive vehicle wherein the movable cowl panel can be operated in an emergency to uncover the front windshield wipers even when the power driven means of the power-driven cowl gets out of order or becomes inoperative, so as to ensure a normal operation of the front windshield wipers.

SUMMARY OF THE INVENTION

According to the present invention, the power-driven cowl comprises a cowl panel movable between a closed position wherein the cowl panel covers a front windshield wiper or wipers disposed in a space formed between a rear end of an engine hood panel and the bottom of a front windshield glass and an open position wherein the cowl panel uncovers and allows the front windshield wipers to operate; cowl driving means including an electric motor for causing the cowl panel to shift between the closed and open positions; cowl forcing means by which the cowl panel is forced to uncover the front windshield wipers; and releasably locking means operative from the driver's seat of the automotive vehicle for manually actuating the cowl forcing means to uncover the front windshield wipers. The cowl driving means shifts the cowl panel between the closed and the open position. The cowl forcing means is, in an emergency, operated remotely from the driver's seat to cause the closed cowl panel to open and uncover the front windshield wipers to allow operation.

In accordance with a preferred embodiment of the power-driven cowl of the present invention, the cowl driving means includes a parallel linkage for causing a substantially parallel movement of the cowl panel by means of the electric motor, and coupling means disposed between and disconnectably coupling the electric motor and the parallel linkage, the coupling means being disconnectably cooperated with the cowl panel forcing means to which the parallel linkage is attached and which is adapted to disconnect the electric motor from the parallel linkage when the forcing means is released through an operation of the locking means by the driver from the driver's seat according to, for example, an emergency need, and to force the parallel linkage to make a substantially parallel movement thereof so as to move the cowl panel from the closed position to the open position, allowing the front windshield wiper to operate.

In accordance with another preferred embodiment of the power-driven cowl of the present invention, the cowl panel is mounted on the parallel linkage for swinging movement and is releasably held on the linkage by a locking means manually operative from the driver's seat. When the locking means is released, the cowl panel is forced to swing up to uncover the front windshield wiper, allowing operation.

According to a feature of the power-driven cowl of the present invention, even though the electric motor of the cowl driving means has gone wrong or becomes inoperative and the cowl panel is in the closed position, the cowl panel can be forced open to uncover the front windshield wipers through a remote operation from the driver's seat, allowing the front windshield wipers to operate.

BRIEF DESCRIPTION OF THE DRAWINGS

These and other objects and features of the present invention will become apparent from the following description taken in conjunction with the preferred embodiments thereof with reference to the accompanying drawings in which like parts are denoted by like reference numerals throughout the views of the drawings and wherein:

FIG. 5 is a fragmentary sectional view of the power-driven cowl taken substantially along a line V—V of FIG. 1, with certain parts omitted for clarity;

FIG. 6 is a vertical sectional view of a disconnectable coupling means of the power-driven cowl taken along a line VI—VI of FIG. 3;

FIG. 6a is a perspective view of a shaft forming part of the coupling means shown in FIG. 6;

DETAILED DESCRIPTION OF A PREFERRED EMBODIMENT OF THE PRESENT INVENTION

Because automotive windshield wipers and their construction and arrangement are well known to those skilled in the art, the following description will refer to those parts in general and will be directed in particular to those elements forming, or cooperating more directly with, the novel power-driven cowl embodying the present invention. It is to be understood, however, that even though the present invention is illustrated by way of preferred embodiments, nevertheless, it may be applied by extension to automotive vehicles, windshield wipers and cowl elements not specifically shown or described herein.

Figure 1:
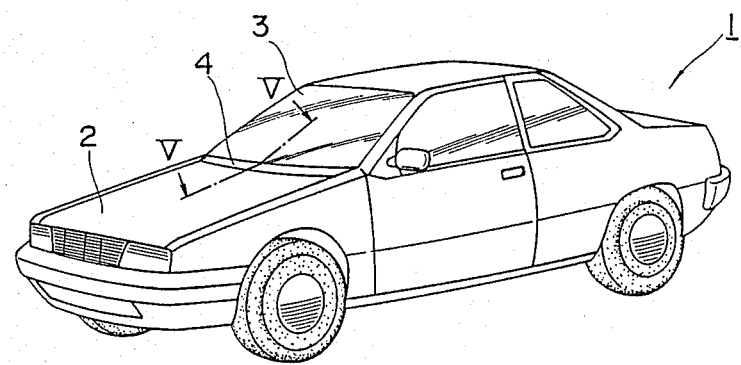
FIG. 1 is a schematic perspective illustration showing an automotive vehicle embodying the present invention.
Figure 2:
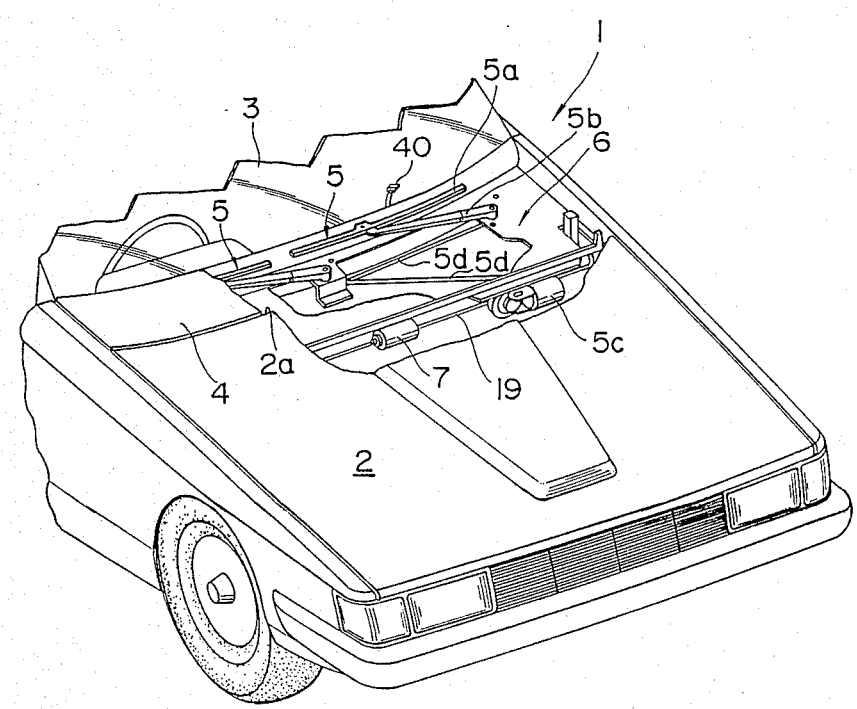
FIG. 2 is a schematic perspective illustration, with portions broken away for clarity, partially showing the automotive vehicle of FIG. 1.

Referring now to the drawings, in particular to FIGS. 1 and 2, an automotive vehicle 1 is shown provided with a power-driven cowl embodying the present invention. The cowl includes a movable cowl panel 4 extending substantially overall the width of the engine of the automotive vehicle 1 and is placed to close a space (which is hereinafter referred to a cowl box) 6 formed between the rear end 2a of engine hood panel 2 and the bottom of front windshield glass 3. Referring to FIG. 5, the cowl box 6 is formed by a panel 6a that is folded back on itself at 6b and terminates at 6c at the lower edge of the windshield glass 3. Both the upper and lower parts of panel 6a are slotted on each side to form vertically aligned slots 6d and 6e. A panel 6f is fixed to the fold 6b. Both panels 6a and 6f are secured to the vehicle body and together define the cowl box 6. A plate 6h having a right angle flange 6i is secured to and carried by panel 6f. The folded back panel 6a defines a lower space 6g. Engine hood panel 2 extends over cowl box 6 partially closing same. A cowl panel 4 serves to provide the remaining closure of the cowl box 6.

In the cowl box 6 is located a pair of known power-driven front windshield wipers 5. As is well known to those skilled in the art, the power-driven front windshield wipers 5 each comprises a wiper blade 5a held by a blade retainer 5b which is operationally coupled to a wiper driving motor 5c through a link rod 5d and is capable of operating either intermittently or continuously in any well known manner. The cowl panel 4, as will be described in detail later with reference to FIGS. 4 and 5, is adapted to move or shift between a closed position shown in FIGS. 1 and 2 wherein the cowl panel 4 closes the top of the cowl box 6 with the power-driven front windshield wipers 5 housed therein, and an open position (see FIGS. 4 and 5) wherein the cowl panel 4 is placed or located below the engine hood panel 2 leaving open the cowl box 6 to expose or uncover the power-driven front windshield wipers 5, thereby allowing them to operate normally without any interference.

Figure 3:
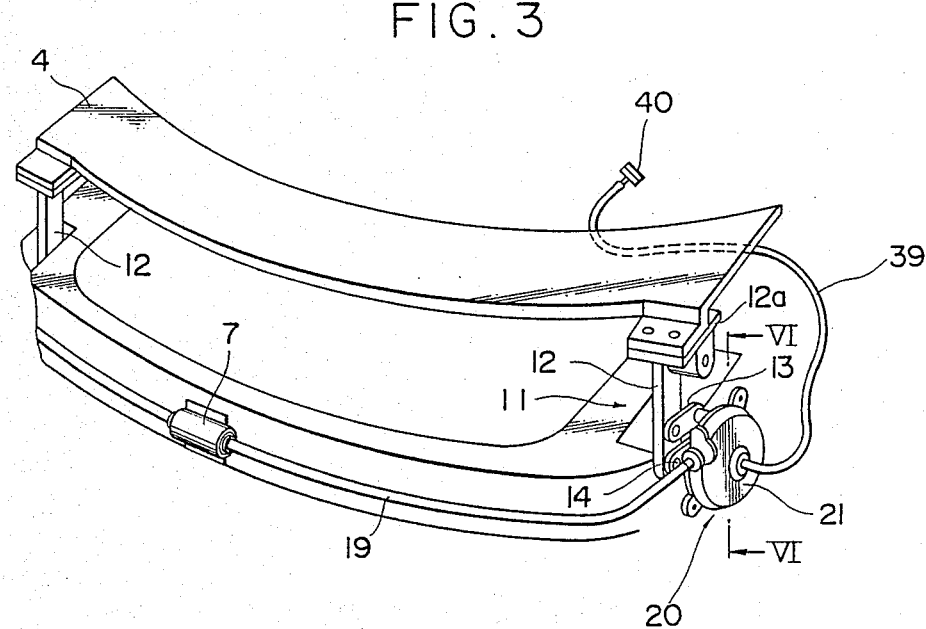
FIG. 3 is a perspective view showing the motor driven-cowl of the present invention.

As shown in FIG. 3, the cowl panel 4 of the power-driven cowl at both sides is supported by cowl driving or shifting means 10 (one of which is hidden in FIG. 3) each consisting of a parallel linkage 11 with the cowl panel 4 attached thereto and a disconnectable coupling means 20 housed in a case 21 for operationally coupling the parallel linkage 11 to a cowl driving motor 7 mounted on plate 6h by any suitable means such as a bracket and screws, as shown in FIG. 3. Motor 7 is an electric motor capable of driving in both directions and is included as part of the electrical circuit of the vehicle and provided with a switch on the dashboard to control operation in either direction. Rotation of the cowl driving motor 7 is transmitted to the parallel linkages 11 through the disconnectable coupling means 20 to cause a parallel movement of the cowl panel 4 between the closed and open position.

Figure 4:
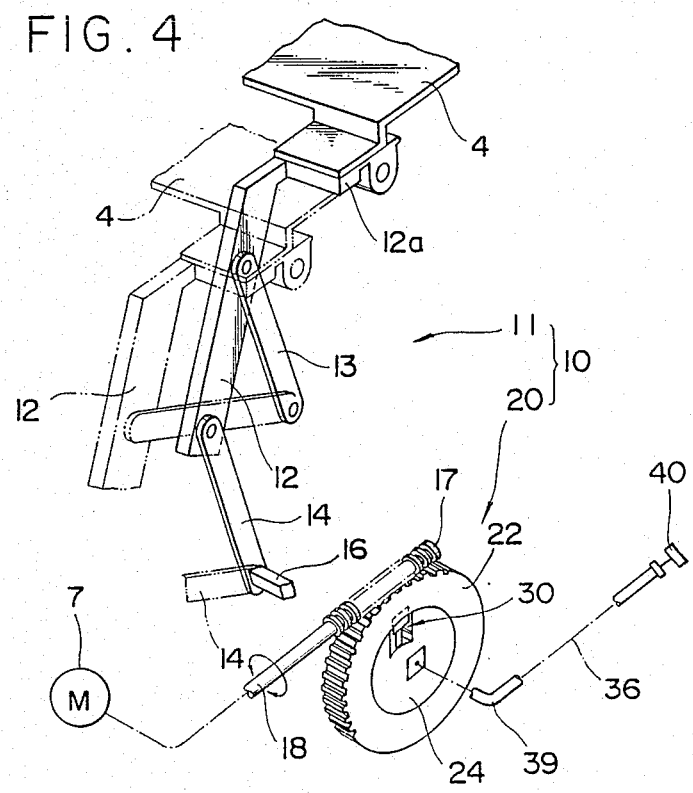
FIG. 4 is an exploded perspective view schematically showing the power-driven cowl of FIG. 3 wherein the cowl plate is placed in the closed position.

Specifically, as is shown in FIG. 4, each of the parallel linkages 11 consists of a generally vertically extending connecting link lever 12 with an enlarged fixing head 12a provided at the top end thereof to which the cowl panel 4 is fixedly attached, an upper crank arm 13 pivotally connected at one end to approximately the middle of the connecting link lever 12 and at its other end and to a part of the body of the automotive vehicle 1, and a lower crank arm 14 pivotally connected at one end to the lower end of the connecting link lever 12. The other end of lower crank arm 14 defines a square hole 14a. Link 12 passes through slots 6d and 6e as shown in FIG. 5.

The disconnectable coupling means 20 serves to operationally and disconnectably couple the parallel linkage 11 to the cowl driving motor 7 as previously noted. Coupling means 20 consists of an external annular worm gear 22 with a worm 17 in the form of a screw threaded rod in meshing engagement therewith. Worm gear 17 is journalled in casing 21. An internal wheel 24, fixed on a shaft 16 concentrically mounted therein, is internally fitted in the external annular worm gear 22 for rotation in housing or case 21. The case 21 is made of two parts 21a and 21b which are peripherally joined at 21c. The case 21 has lugs 21d for attachment to the vehicle body or plate 6h, and internally defined shoulders to keep gear 22 in the proper axial position. Worm rod 17 is connected to the cowl driving motor 7 through a wire or flexible shaft or cable 18 fixed to worm gear 17 at one end and enclosed in a protective tube 19.

Shaft 16 as shown in FIG. 6a can be made from a single block of steel or other suitable material and consists of a central part 16a of square cross section upon which wheel 24, provided with a square axial hole, is mounted for rotation therewith. An enlarged end 16b of circular cross section is fixed to one end of part 16a. A part 16c of smaller circular cross section is fixed to the other end of part 16a and has fixed to it a part 16d of small square section to be received in square hole 14a to constrain crank 14 to rotate therewith. A circular disc 16e terminates shaft 16 and a reduced circular section 16f is defined between part 16d and disc 16e to receive a spring clip 16g to hold crank 14 on shaft 16.

A disconnecting means 30 is provided between internal wheel 24 and annular ring gear 22 as will be described in detail later with reference to FIGS. 6 to 8, and by which the external annular worm gear 22 and the internal wheel 24 are operationally and disconnectably coupled to each other.

As is clearly seen in FIGS. 4 and 5, showing the left side of the vehicle from the driver's viewpoint, when the cowl driving motor 7 is actuated by the dashboard switch to open cowl panel 4, the worm rod 17 is rotated in the clockwise direction as viewed in FIG. 4. The external annular worm gear 22 of the disconnectable coupling means 20 which is in meshing engagement with rod 17 is turned in the counterclockwise direction carrying with it the internal wheel 24. As a result, the square shaft 16 fixed in the internal wheel 24 is turned forcing the lower crank arm 14 of the parallel linkage 11 to pivot counterclockwise as viewed in FIG. 4, and move from the position shown in solid lines to the position shown in broken lines. The swinging-down of the lower crank arm 14 forces the connecting link lever 12 to shift down and forward toward the front end of the vehicle carrying with it the cowl panel 4 attached to the connecting lever 12 to place the cowl panel 4 below the engine hood panel 2, namely, in the open position, as is shown by broken lines in FIGS. 4 and 5. In the open position, the cowl panel 4 opens the cowl box 6 to uncover the front windshield wipers 5 housed in the cowl box 6. On the other hand, if the cowl driving motor 7 is reversed, the disconnectable coupling means 10 is returned to its initial state shown in solid lines in FIG. 4, bringing back the cowl panel 4 to the closed position to close the cowl box 6 and to cover again the front windshield wipers 5 in the cowl box 6.

Figure 7:
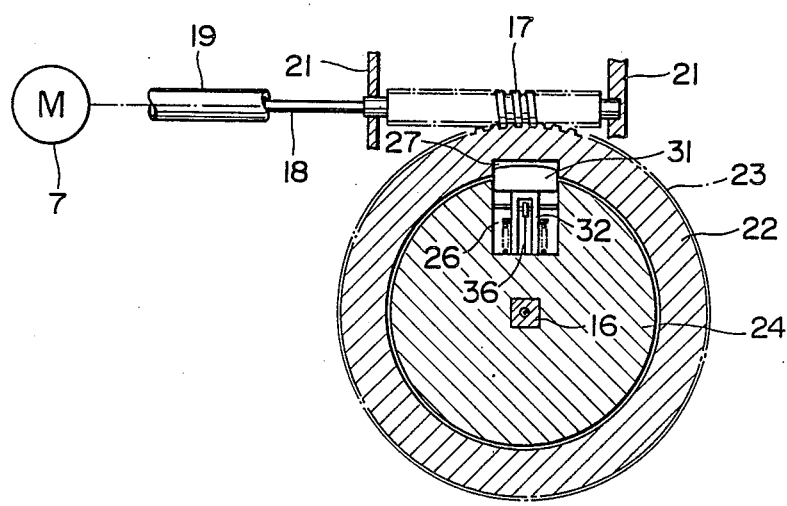
FIG. 7 is a vertical sectional view of the disconnectable coupling means of the power-driven cowl as shown in FIG. 3 wherein an internal wheel is coupled to an external annular worm gear.
Figure 8:
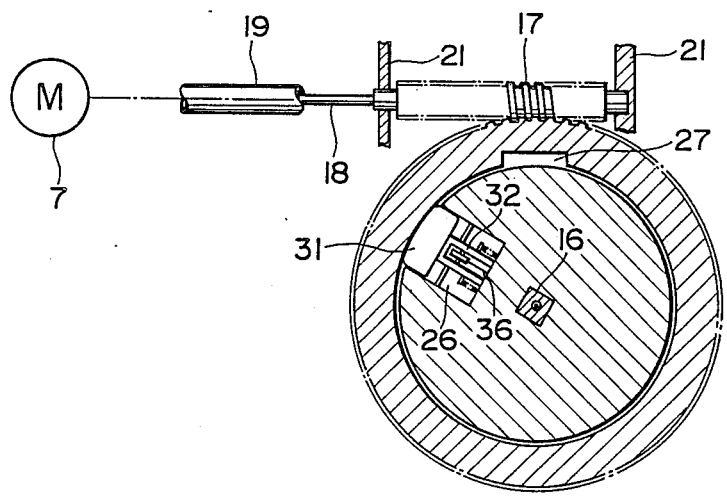
FIG. 8 is a vertical sectional view of the disconnectable coupling means similar to FIG. 7, but wherein the internal wheel is disconnected from the external annular worm gear.

Referring now to FIGS. 6 to 8, one of the two disconnectable coupling means 20 is shown and described in detail. The housing or case 21 defines coaxially aligned bore 21d, through which projects part 16c of shaft 16, and bore 21e. Bearings 25 and 25a of the ball type are secured to the case 21 and bearing mount the part 16c and end 16b of shaft 16 for rotation. The internal wheel 24 defines a square axial bore 24a which receives the square part 16a of the shaft 16 and, therefore, is fixed to shaft 16 in a rotational sense. As noted, teeth 23 of the external annular worm gear 22 mesh with the worm rod 17 which is journalled in the case 21 and connected to an output shaft of the cowl driving motor 7 by means of cable 18 enclosed in protective tube 19. On the other hand, to the casing 21 and the square part 16a of shaft 16, a wound torque spring 28 is connected biasing the shaft 16 and the wheel 24 to turn in the counterclockwise direction as viewed in FIG. 4.

The disconnecting means 30 is arranged in a recess or space 26 formed in the inner wheel 24 and consists of a key member 31 fixed to a supporting depending bifurcated stem 32. A recess 27 is formed in the gear 22 and partially receives the key member 31 of the disconnecting means 30, as shown in FIG. 6. Pivotally mounted at 33a to wheel 24 is an actuating arm 33 which is also pivotally connected at 33b to the supporting stem 32 between its legs and approximately at the middle thereof. The key member 31 is normally urged or biased upwardly by means of an expansion or compression spring 34 disposed around the supporting stem 32 and confined between a retaining ring 35 fixed on stem 34 and the wheel 24 forming the bottom of the space 26 to normally place the key member 31 in the recess 27 of the external annular worm gear 22 and, therefore, lock the gear 22 and wheel 24 together for mutual rotation. Due to the engagement of the key member 31 with the recess 27 of the external annular worm gear 22, the internal wheel 24 is coupled to the external annular worm gear 22. Therefore, the external annular ring 22 and the internal wheel 24 can turn as one body when the external annular worm gear 22 is rotated by the cowl driving motor 7 through the worm 17.

Connected to the actuating arm 33 at its free end is an operating wire 36 which extends outside the casing 21 passing through a radial bore 37 formed in the internal wheel 24 and shaft 16, an axial bore 38 formed in the shaft 16 communicating with the radial bore 37 and bore 21e in casing 21. A lug or fitting 21g is fixed to the casing 21 about bore 21f. Wire 36 extends into the vehicle and terminates in proximity to the driver's seat in the automotive vehicle 1. As is shown in FIGS. 2 and 3, an operating member 40 is placed at the end of and fixed to wire 36. Between the lug 21g of casing 21 of the disconnectable coupling means 20 and the driver's seat, the operating wire 36 is enclosed in a flexible protective tube 39. The end of wire 36 is conventionally held in a bracket mounted on the dashboard so that, by pulling the operating wire 36 with the aid of the operating member 40 from the driver's seat, the disconnecting means 30 is actuated. Tube 39 is attached to lug 21g on one end and the bracket on the other end. In more detail, when the operating member 40 is pulled by the driver, the wire 36 is pulled down within wheel 24 and the actuating arm 33 is pivoted and forced down, forcing stem 32 down against the expansion or compression spring 34 retracting the key member 31 from and disengaging from the recess 27 of the external annular worm gear 22 to thereby disconnect the internal wheel 24 from the external annular worm gear 22. Stem 32 enters recess 26a formed at bottom of recess 26 as it is lowered.

When key member 31 is removed from recess 27, wound torque spring 28, engaged to the casing 21 and the shaft 16, now is no longer restrained and drives the internal wheel 24 rotationally coupled to it quickly in the counterclockwise direction, as shown in FIG. 8, while the external annular worm gear 22 remains as it is. Driving shaft 16 causes parallel linkage 11 to move forwardly and downwardly, to the same extent as previously noted with reference to the external annular worm gear 22 turning the internal wheel 24, to place the cowl panel 4 below the engine hood panel 2 and thereby to uncover the front windshield wipers 5. It should be noted that the provision of the axial bore 38 formed in the fixed shaft 16 is quite convenient to allow the counterclockwise turning of the internal wheel 24 and shaft 16 without any further extension of or stress on the wire 36.

To couple the internal wheel 24 to the external annular worm gear 22 again, either the cowl panel 4 or the connecting link lever 12 is manually pulled upwardly rearwardly to cause a parallel movement of the parallel linkage 11 upwardly rearwardly. This parallel movement of the parallel linkage 11 will be followed by a clockwise turn of the internal wheel 24 until the key member 31 is brought into engagement with the recess 27 of the external annular ring 22. As a result, the internal wheel 24 is brought into recoupling to the external annular worm gear 22 simultaneously with the engagement of the key member 31 of the disconnecting means 30 with the recess 27 of the external annular worm gear 22. It is apparent that the torque spring 28 will be rewound with the clockwise turning of the internal wheel 24.

In operation of the power-driven cowl according to the present invention, when it is required to operate the windshield wipers 5, a cowl operating switch (which is not shown but is provided in proximity to the driver's seat) is operated to actuate the cowl driving motor 7 prior to an operation of the windshield wipers 5. The driving motor 7 starts its normal rotation to rotate the worm rod 17 through the wire 18, causing the counterclockwise rotation of the external annular worm gear 22 to which the internal wheel 24 is coupled through the engagement of the key member 31 of the disconnecting means 30. Key member 31 is locked into the recess 27 defined in the external annular worm wheel 22. As a result, the square part 16a of shaft 16 received in the internal wheel 24 turns in the counterclockwise direction, swinging down the lower crank arm 14 rotationally fixedly attached to the square part 16d of shaft 16 to shift the connecting link lever 12, and hence the cowl panel 4 attached to the connecting link lever 12, forwardly and downwardly in a substantially parallel movement, carrying the cowl panel 4 forwardly and downwardly to place it below the engine hood panel 2 as is shown in broken lines of FIG. 5, opening the cowl box 6 to uncover the front windshield wipers 5. At the end of the parallel movement of the cowl panel 4, limit switch 59 mounted on panel 6f is contacted and activated by the connecting link lever 12 so as to activate the wiper driving motor 5c, operating the front windshield wipers 5 either intermittently or continuously in any well known manner. It should be noted that the limit switch 59 is in the electric control circuit for the wipers 5. Switch 59 may be replaced by a manually operative wiper operating switch disposed on the dashboard in proximity to the driver's seat. If the manually operative wiper operating switch is provided on the dashboard, it is operated after the actuation of the cowl operating switch.

After the use of the front windshield wipers 5, the cowl operating switch is manually actuated to reverse the cowl driving motor 7. In consequence, the external annular worm gear 22 with the internal wheel 24 coupled thereto is turned in the reverse or clockwise direction to cause a parallel movement of the parallel linkage 11 upwardly rearwardly, shifting the cowl panel 4 to the closed position so as to close the cowl box 6 and thereby to cover the front windshield wipers 5 housed in the cowl box 6. At the beginning of the parallel movement of the cowl panel 4, and hence the connecting link 12, the limit switch 59 is turned off; the wiper driving motor 5c is timely stopped in such a way that the windshield wipers 5 are placed in the cowl box 6 timely before the cowl panel 4 fully closes the cowl box 6.

In case of trouble and the cowl driving motor 7 and/or the cowl driving means 10 cannot operate properly, e.g., due to rain or snow, the operating member 40 can be manually pulled by the driver. If in fact the operating member 40 is operated in an emergency, the actuating arm 33 is forced down to retract the key member 31 of the disconnecting means 30, disengaging it from the recess 27 of the external annular worm gear 22. As a result, the internal wheel 24 is disconnected from the external annular worm gear 22, being quickly turned in the counterclockwise direction by means of the torque spring 28. As is apparent from the previous description, the counterclockwise movement of the internal wheel 24 causes the parallel movement of the parallel linkage 11 forwardly downwardly and thereby shifts the cowl panel 4 in the same direction to place it below the engine hood panel 2, opening the cowl box 6 to uncover the front windshield wipers 5. In the same way as when the cowl operating switch is operated, the wiper driving motor 5c is actuated to operate the windshield wipers 5 in customary fashion. In the case of an emergency opening of the cowl panel 4, it is impossible to automatically return the cowl panel to the closed position. Therefore, the cowl panel is manually returned to the closed position in the manner previously described.

Reference is now had to FIGS. 9 to 12 showing another preferred embodiment of the power-driven cowl according to the present invention. In this embodiment, the power-driven cowl includes a cowl driving or shifting means substantially similar to the cowl driving means 10 of the previous preferred embodiment described above with reference to FIGS. 1 through 8. However, the disconnecting means 30 of the previously preferred embodiment is replaced with a releasable locking means 50 which directly cooperates with the cowl panel 4 and, therefore, the internal wheel 24 of the disconnectable coupling means 20 is omitted.

Figure 9:
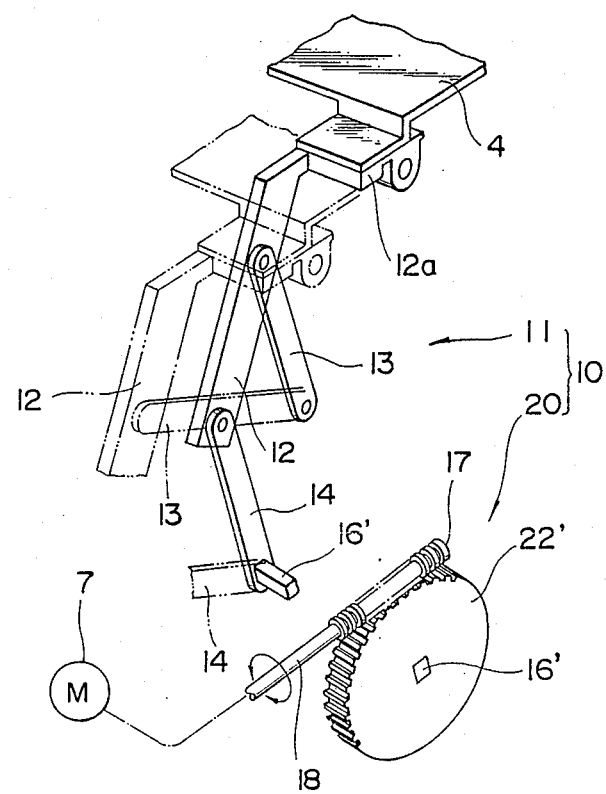
FIG. 9 is an exploded perspective illustration, similar to FIG. 4, schematically showing the power-driven cowl of another preferred embodiment of the present invention.

As is shown in FIG. 9, the parallel linkage 11 by which the cowl panel 4 is pivotally supported is fixed directly to a worm gear wheel 22' through a fixed square shaft 16'. Shaft 16' is fixed to the lower end of crank 14 and is received in a square hole 16" defined axially in gear 22'. The worm gear wheel 22' is engaged by the worm 27 connected to the output shaft of the cowl driving motor 7 through the wire 18 enclosed in the protective tube 19. Therefore, the cowl panel 4 can be moved between the closed and open positions just in the same manner as when it is operated in the previously described preferred embodiment.

Figure 10:
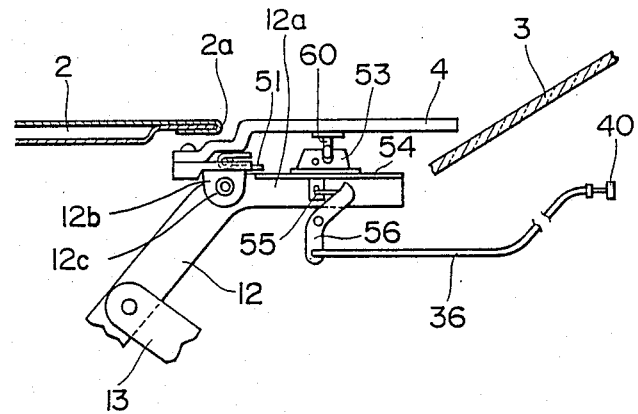
FIG. 10 is a fragmentary side view of the power-driven cowl of FIG. 9 with parts broken away for clarity wherein the cowl panel is placed in the closed position.
Figure 11:
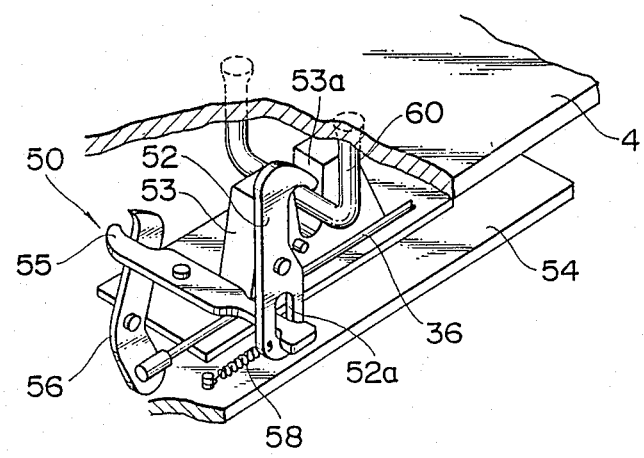
FIG. 11 is a perspective illustration showing in detail a locking means of the power-driven cowl of FIG. 9.
Figure 12:
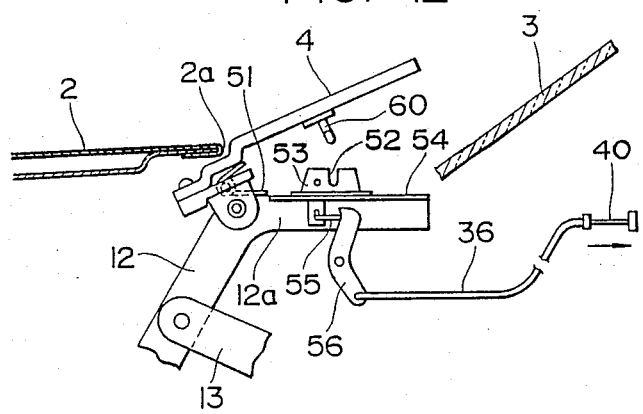
FIG. 12 is a fragmentary side view similar to FIG. 10 showing the power-driven cowl of FIG. 9 wherein the cowl panel is opened in an emergency need.

Referring now to FIGS. 10 to 12, the releasable locking means 50 is shown. The cowl panel 4 is fixed to and supported by the fixing head 12a of the connecting link lever 12 for pivotal movement via bracket 12b and pivot pin 12c. Engaged between the cowl panel 4 and the fixing or mounting head 12a is a spring 51 as cowl driving means by which the cowl panel 4 is forced to quickly swing up when released. The cowl panel 4 thus supported is releasably locked by a hook lever 52 of the releasable locking means 50 shown in detail in FIG. 11. The locking means 50 is supported on a base plate 54 fixed to the mounting head 12a of the connecting lever 12 and extends rearwardly. The hook lever 52 has a sloped top end and is pivotally mounted by pin 52b on a base block 53 attached to the base plate 54. Hook lever 52 has an elongated slot or opening 52a formed at its lower end. An interconnecting lever 55 is pivotally mounted via pin 55a on the base plate 54. Lever 55 is pivoted substantially at the middle thereof and one end of lever 55 is loosely held or received in the elongated slot or opening 52a of the hook lever 52. An actuating lever 56 is pivotally mounted via pin 56a on the base plate 54 and extends substantially vertically. The top end of the actuating lever 56 engages the free end of the interconnecting lever 55. At its lower end, lever 56 is connected via fitting 56b to wire 36 leading to emergency operating member 40 located inside the vehicle 1. Connected to the lower end of the hook lever 52 and to a pin 54a fixed to the base plate 54 are the two ends of a spring 58 which forces or biases or urges the hook lever 52 into turning in the clockwise direction (as viewed in FIG. 11) thereby urging it to releasably engage, hook and lock a shackle 60 fixed to the underside of the cowl panel 4. Through this engagement between the hook lever 52 and the shackle 60, the cowl panel 4 is held in its locked position as shown in FIG. 10. For easy and positive holding, the top of base block 53 is bifurcated to form a groove 53a into which the shackle 60 of the cowl panel 4 is received when it is engaged by the hook lever 52.

When the wire 36 is pulled by the driver pulling the emergency operating member 40, the actuating lever 56 is turned in the counterclockwise direction as viewed in FIG. 11 to thereby turn the hook lever 52 counterclockwise against the spring 58 through the intermediary of the interconnecting lever 55. In consequence, the hook lever 52 releases the shackle 60, allowing the cowl panel 4 to turn or swing up quickly under the influence of the spring 51, to reach the position as is shown in FIG. 12.

The swung up cowl panel 4 can be manually returned. In more detail, by manually pushing the swung up cowl panel 4 against the spring 51, the shackle 60 will abut the sloped top end 52c of the hook lever 52 and presses it back or cams it counterclockwise against the spring 58. As a result, the shackle 60 rides down over the sloped top end of the hook lever 52 and enters into the groove 53a. At the moment the shackle 60 rides over the sloped top end of the hook lever 52, the hook lever 52 is forced to turn in the counterclockwise direction. When the shackle 60 is received in the groove 53a of the base block 53, shackle is free of end 52c and now the lever 52 will be forced clockwise by spring 58 to relock shackle 60 and thereby to hold the cowl panel 4 in the locked position.

The power-driven cowl of this embodiment thus constructed and described above with reference to FIGS. 9 to 12 can be operated automatically in the same manner as that of the previously preferred embodiment. In an emergency, namely, in case of trouble with the cowl driving motor 7 and/or the cowl driving means 10, e.g., due to rain and snow, the emergency operating member 40 is operated by the driver. When the emergency operating member 40 is pulled, the actuating lever 56 is turned in the counterclockwise direction, causing a counterclockwise movement of the hook lever 52 against the spring 58. As a result, the hook lever 52 releases the shackle 60 of the cowl panel 4, permitting the cowl panel 4 to swing up quickly due to spring 51. In this way, the cowl panel 4 opens the cowl box 6 to uncover and allow the front windshield wipers 5 to operate.

In the embodiments described above, various changes are permissible. For example, the limit switch 59 may be replaced by a manually operative wiper driving switch as is well known in the art and the cowl panel may be driven by a pair of driving motors provided one on each side thereof for improving cowl driving power. Although in the above-described embodiments the parallel linkage is used to shift the cowl panel 4 between the closed and the open position, nevertheless, any other well known mechanism can be incorporated to close and open the cowl box or to cover and uncover the front windshield wiper or wipers.

Although the present invention has been fully described by way of preferred embodiments thereof with reference to the accompanying drawings, it is to be noted that various changes and modifications will be apparent to those skilled in the art. Therefore, unless otherwise such changes and modifications depart from the scope of the present invention, they are deemed to come with the purview of the invention.

What is claimed is:

1. A power-driven cowl for an automotive vehicle having a cowl panel which is shiftable between a closed position wherein said cowl panel closes a spaced formed between the rear end of an engine hood panel and a front windshield glass to cover a front windshield wiper housed in said space, and an open position wherein said cowl panel open said space to uncover said front windshield wiper so as to allow it to operate, said power-driven cowl comprising:
    mounting means mounting said cowl panel for pivotal movement;
    motor driven cowl shifting means coupled to said mounting means for moving said mounting means downwardly and forwardly relative to said hood so as to shift said cowl panel between said closed and open positions;
    cowl driving means mounted on said mounting means for causing said cowl panel, when said cowl panel is in said closed position covering said front windshield wiper, to pivotally move to uncover said front windshield wiper, said mounting means being stationary during the pivotal movement; and
    locking means disposed between said mounting means and said cowl panel for releasably locking said cowl panel at said covering position.

2. A power-driven cowl as defined in claim 1, wherein said locking means can be operated from a driver's seat to release said cowl panel.

3. A power-driven cowl as defined in claim 2, wherein said locking means comprises a hook member supported by said mounting means and a shackle member fixed to said cowl panel which is releasably hooked by said hook member.

4. A power-driven cowl as defined in claim 2, wherein said cowl driving means comprises a spring engaged between said mounting means and said cowl panel.

5. A power-driven cowl as defined in claim 3, wherein said locking means further comprises an actuating member in cooperation with said hook member, said actuating member being operated from inside said automotive vehicle to release said cowl panel.

6. A power-driven cowl as defined in claim 5, wherein said locking means further comprises a spring member for forcing said hook member into hooking said shackle member.

7. A power-driven cowl as defined in claim 1, wherein said motor drive cowl shifting means comprises a worm connected to an electric motor through a drive cable and a worm gear engaged by said worm, said worm gear being operationally coupled to said mounting means.

8. A power-driven cowl as defined in claim 7, wherein said motor driven cowl shifting means further comprises a parallel linkage by which said worm gear is coupled to said mounting means so as to cause a parallel movement of said cowl panel between said closed and open positions.

9. A power-driven cowl as defined in claim 8, wherein said cowl panel is placed below said engine hood panel in said open position.

* * * * *